United States Patent [19]
Craig

[11] 3,906,975

[45] Sept. 23, 1975

[54] HYDRAULIC PULSED GOVERNOR

[75] Inventor: James T. Craig, Indianapolis, Ind.

[73] Assignee: General Motors Corporation, Detroit, Mich.

[22] Filed: Mar. 8, 1974

[21] Appl. No.: 449,361

[52] U.S. Cl. .................... 137/56; 91/429; 137/330
[51] Int. Cl.² ........................................ G05D 13/38
[58] Field of Search ......... 137/56, 330; 91/429, 430

[56] References Cited
UNITED STATES PATENTS

| | | | |
|---|---|---|---|
| 2,455,315 | 11/1948 | Rose et al. | 137/330 X |
| 2,516,723 | 7/1950 | Rodeck et al. | 91/429 |
| 2,542,765 | 2/1951 | Gillespie | 91/429 |
| 2,623,504 | 12/1952 | Rodeck et al. | 91/429 X |
| 2,762,384 | 9/1956 | Rosenberger | 137/56 X |
| 3,052,217 | 9/1962 | Denman et al. | 91/429 X |

*Primary Examiner*—Robert G. Nilson
*Attorney, Agent, or Firm*—A. M. Heiter

[57] ABSTRACT

A hydraulic pulsed governor having a regulator valve element mounted for reciprocation in a valve sleeve rotatably mounted in a valve body. The valve sleeve is rotatably driven by the controlled device and has fly weights and a governor pressure bias chamber oppositely biasing the valve element to regulate a supply pressure to provide a governor pressure proportional to rotary speed. The supply pressure is also connected from the body through the sleeve cyclically during each revolution to the bias chamber by passages including cyclically matching ports at the body and sleeve interface to provide a pulsing bias pressure to vibrate the governor pressure regulator valve at a higher frequency than the valve regulatory movement.

8 Claims, 5 Drawing Figures

US Patent  Sept. 23, 1975  3,906,975
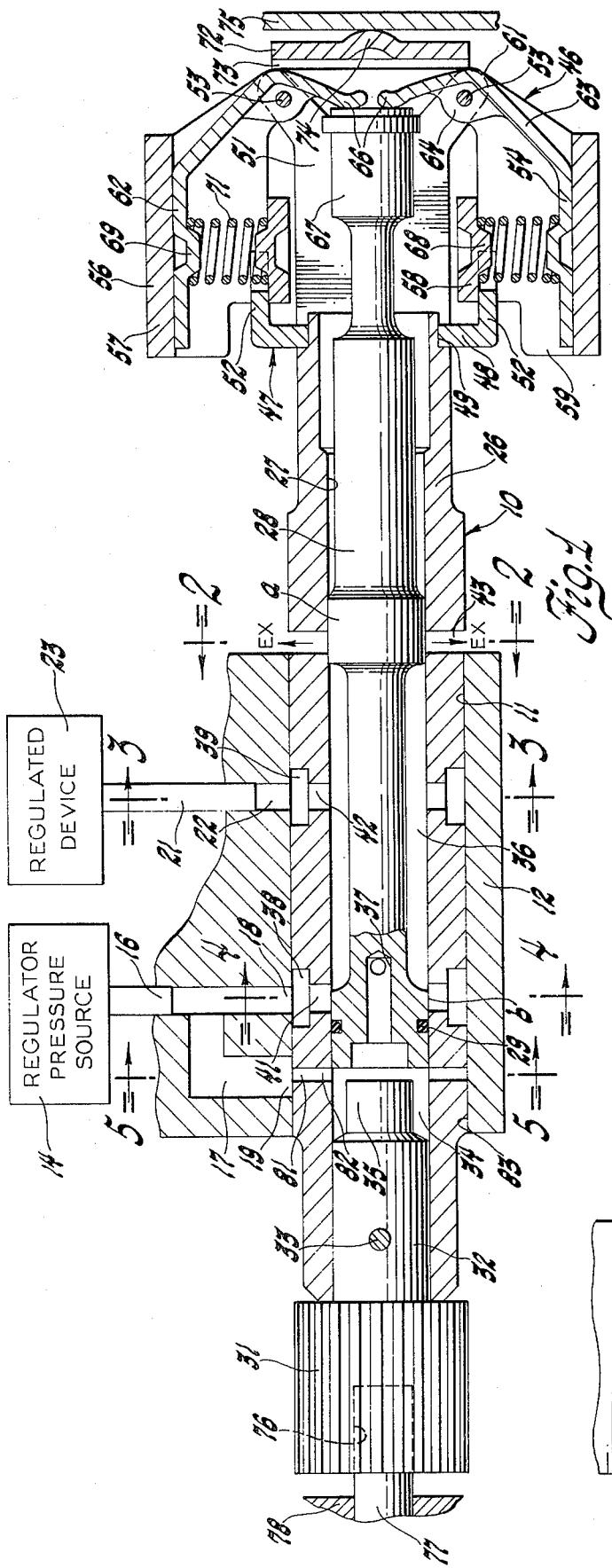
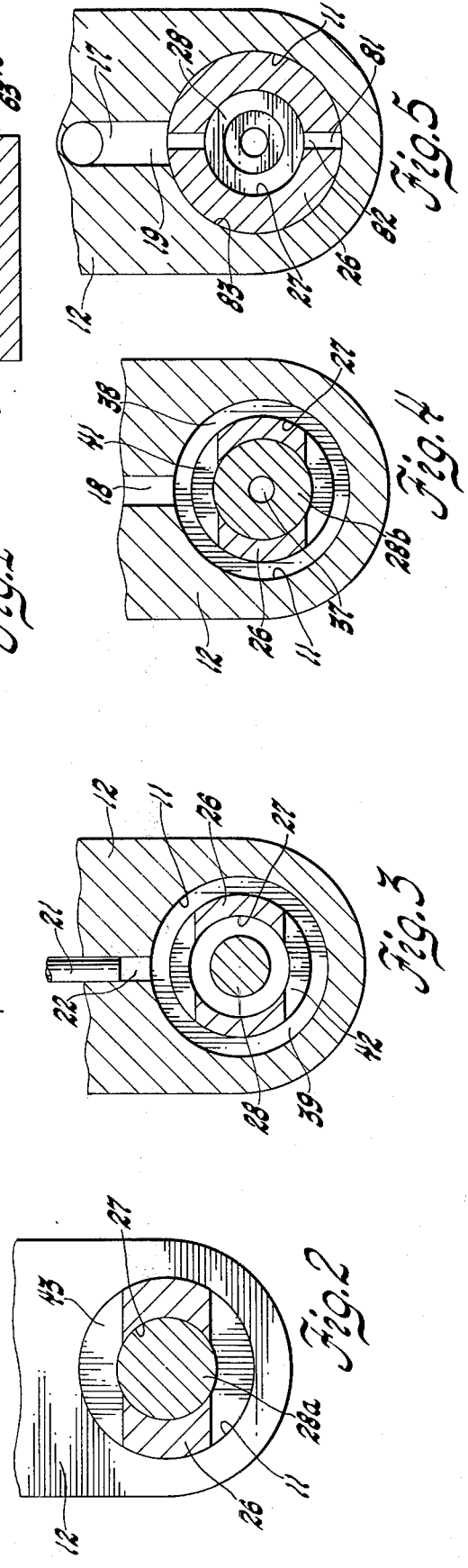

HYDRAULIC PULSED GOVERNOR

BACKGROUND OF THE INVENTION

The invention relates to hydraulic pulsed valves and particularly to hydraulic pulsed speed governor pressure regulator valves.

Hydraulic speed governors having a governor pressure regulator valve regulating a governor pressure proportional to speed and having a pulsing mechanism to provide a relative oscillating movement between valve parts to reduce friction during regulatory movement are known as in Rose et al. U.S. Pat. No. 2,455,315 patented Nov. 30, 1948. Governor valves are also known, Rosenburger U.S. Pat. No. 2,762,384 patented Sept. 11, 1956, having a spool valve mounted for regulatory reciprocation in the bore of a valve sleeve which is rotatably mounted in a bore of a valve housing. The valve sleeve is rotated at governed speed and the spool valve controlled by the opposing speed responsive fly-weight biasing force and a governor pressure biasing force regulates the governor pressure proportional to the rotary speed.

SUMMARY OF THE INVENTION

The invention provides in a rotating hydraulic regulator valve an improved simplified arrangement providing pulsing, relative oscillating movement, between the valve parts to keep the valve free and maintain reduced friction for the regulatory movement. The regulatory movement of regulator valves is controlled by a control bias force and a regulated pressure bias force to provide a regulated pressure and the rotary movement provides a pulsing pressure acting to intermittently modify the bias force to oscillate or vibrate the valve parts relative to each other. The pulsing pressure has a pulse during a short portion of each cycle of the rotary movement.

In the hydraulic speed governor construction, the regulator valve consists of a valve sleeve with a valve spool mounted in the bore of the valve sleeve for reciprocating regulatory movement and the valve sleeve is rotatably mounted in a bore in a stationary valve housing. The valve sleeve is rotatably driven at governor speed and has fly-weights biasing the spool valve against the regulated governor pressure in a biasing chamber. The governor pressure, supply pressure and exhaust ports in the bore of the sleeve are continuously connected through the sleeve to their passages in the valve housing. The governor pressure is also connected by a restricted passage to the biasing chamber. The fluid pressure supply, regulated at a pressure above the range of governor pressure, is connected by a passage to an internal pulse port in the bore in the stationary housing. A pulse passage, which is restricted, connects an external pulse port on the external surface of the valve sleeve to the biasing chamber. The external pulse port extends over a very small circumferential portion of the bore in the housing. The external pulse port extends over a smaller portion of the external surface of the valve sleeve. Once during each revolution or cycle of the rotary valve sleeve, the external pulse port traverses the internal pulse port to provide a connection at their interface to supply a pulse of high pressure to the biasing chamber. The pressure pulse occurs during a very small portion of each revolution and normal regulation occurs during the remaining long portion of each revolution. These pressure pulses impose on the normal regulating oscillating movement a pulse oscillating movement of greater frequency and less amplitude to cause movement between the valve members to provide lower moving friction and prevent sticking. In governors operating at low speed, two or more external pulse ports equally circumferentially spaced about the sleeve are used to provide two or more pulses during each revolution so the pulse frequency is greater than the frequency of the regulatory oscillating movement.

These and other features of the invention will be more apparent from the following drawing and detailed description of a preferred embodiment of the invention.

BRIEF DESCRIPTION OF DRAWING:

FIG. 1 is a schematic and partial sectional view of the hydraulic governor.
FIG. 2 is a section view of FIG. 1 on the line 2—2.
FIG. 3 is a sectional view of FIG. 1 on the line 3—3.
FIG. 4 is a section view of FIG. 1 on the line 4—4.
FIG. 5 is a section view of FIG. 1 on the line 5—5.

DESCRIPTION OF PREFERRED EMBODIMENT:

The governor valve assembly 10 is rotatably mounted in a bore 11 in the stationary housing or valve body 12. Only the essential portions of the housing 12 are shown but will be understood that a governor housing or when the governor is used in the transmission, the transmission housing completely encloses the governor assembly. A suitable regulated pressure source 14 normally consisting of a sump, pump and regulator valve supplies a regulated pressure to the supply line 16 and a branch thereof 17, which respectively have axially spaced circular ports 18 and 19 at one side of the bore 11 in the valve body 12. The governor pressure line 21 has a circular port 22 at the bore 11 and is connected to the regulated device 23 which in automatic transmissions may be a shift valve.

The governor valve assembly 10 includes the valve sleeve 26 having an internal bore 27 for the spool valve element 28 which has equal diameter lands $a$ and $b$ mounted for reciprocation in the bore 27. The land 28$b$ has a seal 29. At the lower end of the valve sleeve 26, a drive gear 31 has a shaft portion 32 fitting in the bore 27 and is secured by pin 33 to the sleeve 26. The shaft portion 32 is also a closure portion that closes the end of bore 27 adjacent land $b$ of spool valve 28 to provide a bias chamber 34 in the valve sleeve between the closure and land $b$. Shaft 32 has an abutment portion 35 to limit opening movement of the valve element 28. The adjacent ends of abutment portion 35 and valve element 28 are unfinished or grooved so they do not seal when in abutting engagement. The recess 36 between the lands $a$ and $b$ is connected by restricted passage 37 to the biasing chamber 34. The supply port 18 and governor port 22 in the body are respectively aligned with annular grooves 38 and 39 in the valve sleeve connected by oppositely disposed slot ports 41, 42 to the bore 27 of the sleeve 26 for control by the lands $a$ and $b$ of the spool valve. The exhaust slot ports 43 extend from the bore 27 to the external surface of the sleeve 26 to the sump. The housing 12 provides a suitable exhaust passage for this exhaust and leakage exhaust to return to the sump portion of the regulated pressure source 14. The governor pressure port 42 is always opened to recess 36 and has on the side adjacent the bias chamber 34 the supply port 41 and on the side adjacent the fly-weight assembly 46, the exhaust port 43. The distance between the lands a and b of spool valve 28 is slightly less than the distance between the supply port 41 and exhaust port 43 so that in the central position of the spool valve, both the supply and exhaust ports are slightly closed and a very small regulatory oscillating or reciprocating movement of the spool valve will selectively just barely crack open the supply port 41 or the exhaust port 43 to connect the governor pressure port 42 to either the supply port 41 or the exhaust port 43 for regulatory operation.

The fly-weight assembly 46 has an integrally formed support member 47 having an annular portion 48 secured in a recess 49 at the end of sleeve 26, a pair of oppositely disposed pivot portions 51 and a pair of oppositely disposed stop portions 52. The pivot and stop portions are flat and extend axially beyond the valve sleeve. A pair of pivot pins 53 are mounted on the upper free end of the pivot portions 51 at each edge and extend between the pivot portions. An inner weight 54 and an outer weight 56 are pivotally supported on each pivot pin 53. The outer weight 56 is heavier than the inner weight 54.

The outer weight members 56 have a substantially box-like section with an outer wall portion 57 and an inner wall portion 58 and two side wall portions 59 at least one of which is secured to both the inner and outer wall portions. Both of the side wall portions 59 have an ear portion 61 suitably apertured to pivotally mount the outer weight 56 on the pivot pin 53. The inner weight 54 has a flat weight portion 62 located between the side walls 59 and the inner and outer walls 58 and 57 of the outer weight 56 and a mounting extension 63 having ears 64 to pivotally mount the inner weight 54 on the pivot pin 53. The extension 63 has a lever portion 66 extending beyond the pivot pin 53 and contacting the end of the valve stem portion 67 of spool valve 28. The inner wall 58 of weight 56 has a locating boss 68 and the flat portion 62 of inner weight 54 has a locating boss 69 to locate and position the spring 71 between the inner wall 58 of the outer weight 56 and the portion 62 of the inner weight 54.

Such dual weight governor fly-weights provide a force on the regulator valve varying in two regulating phases to provide a governor fly-weight force varying more nearly in a straight line relationship with speed. During both of these regulating phases the spool valve 28 dwells or oscillates in the very small range of regulatory movement so each inner weight 54 moves with the stem 67 of the spool valve and oscillates in a very small range of positions intermediate and spaced from the inner wall portion 58 and the outer wall portion 57 of the outer weight 56. In the first or low speed phase, the outer weight 56 has its inner wall 58 spaced inwardly of stop portion 52 and moves outwardly under the influence of centrifugal force relative to the inner weight 54 providing an increasing force as the spring 71 is compressed to add to the force provided by centrifugal force acting on the inner weight 56. Since the weight 54 including portion 62 in an intermediate free position between the inner wall 58 and the outer wall 57 of the outer weight 56 and the outer weight 56 is free of stop 52 both weights function in response to centrifugal force providing a two weight regulating phase. When the outer weight inner wall 58 engages stop 52 the operation of the outer weight is disabled. Thereafter in the second or high speed phase only the inner weight 54 is acted on by centrifugal force to continue to freely oscillate in the space between the inner and outer walls of the fixed outer weight 56 nearer the outer wall to provide further increasing force proportional to increasing speed through the lever 66 on the spool valve. Thus the governor weight assembly 46 provides a governor force on valve element 28 increasing substantially as a straight line function of speed in the governor speed range. The weights are shown in FIG. 1 in their outer limit position where the inner wall 58 of the outer weight is abutting stop 52 and inner weight 54 is abutting outer weight outer wall 57, providing maximum valve opening to the source. This limit position prevents the weights from contacting the housing and is beyond the oscillatory regulating range of movement and would occur during rotation without a source pressure or at speeds above the governor speed range.

A bearing cap 72 extends across the top of the governor assembly between the pivot portion or side walls 51 of the support member 47 and is secured to the pivot portions. The bearing cap 72 has an end wall 73 at each side externally of the pivot portions 51 apertured to receive the pivot pins 53 to secure the bearing cap 72 to the side walls 51. The bearing cap 72 has a bearing dimple 74 centrally located on the axis of rotation of the governor valve assembly 10. The bearing dimple 74 engages a housing portion 75 of the governor housing 12 to axially locate the governor assembly. At the opposite end of the governor assembly the gear 31 has a closed bore 76 receiving a thrust bearing pin 77 which is fixed in another housing portion 78 to limit axial movement of the governor valve assembly 10 in the other direction. The pin 77 and the bearing dimple 74 axially position the governor valve assembly 10 in the bore 11 of the housing 12.

The valve sleeve 26 has aligned with the branch regulated pressure source port 19 a pair of diametrically opposed radially extending restricted pulse ports 81 and passage 82 connecting the interface 83 between the bore 11 in the outer or external surface of sleeve 26 to the biasing chamber 34 to provide a source pressure pulse to the biasing chamber 34 each time a port 81 moves across the branch source port 19.

The above described governor operates when a regulated pressure is supplied from the source 14 to the supply line 16 and branch supply line 17 and the governor drive gear is driven at a speed in the governed speed range substantially equal or proportional to the device being governed to provide a regulated governor pressure in line 21 to the regulated device 23. The governor pressure in the governor passage provided by the line 21 and its port 22 in the governor body 12 and the connecting annular groove 39 in ports 42 in the sleeve 26 is continuously connected during rotation of the governor valve assembly to the governor port 42 and recess 36 between the lands a and b of valve spool 28 and also from the recess 36 through the restricted passage 37 in the valve spool to the biasing chamber 34. Governor pressure in biasing chamber 34 acts on the end area of land 28b to bias the valve element 28 against the governor weight bias force provided by the governor weight assembly 46 through the fingers 66 to provide a governor pressure in line 21 proportional to the governor weight force and thus the speed of rotation of the governor assembly 10 and the governed or regulated device. A supply passage provided by supply line 16, supply port 18, annular recess 38 and port 41, during rotation of the governor valve assembly 10, continuously connects the regulated pressure source 14 to port 41 for control by land 28b. An exhaust passage provided by exhaust port 43 and the space in the housing during rotation of the governor valve assembly 10, continuously connects the exhaust controlled by land 28a to the sump of the regulated pressure source. The spool valve 28 in the central position closes both the regulated pressure source port 41 and exhaust port 43 in the sleeve 26 and has a continuous very small oscillatory regulating movement to slightly crack open either the supply port 41 or the exhaust port 43 to regulate the governor pressure proportional to the governor weight or speed force. During this regulatory action the regulated pressure source, a pressure higher than the governor pressure, is connected to circular port 19 at the internal surface or bore 11 in the valve body 12 at the interface 83. This port 19 extends over a small portion, e.g., 5° of the circumference of bore 11 or interface 83. The port 81 at interface 83 and connecting passage 82 are smaller and extend over a smaller portion of the circumference of the exterior surface of sleeve 26 or interface 83. Thus during each revolution of the governor sleeve 26, each pulse port 81 traverses the port 19 and during this short portion about 5° of the 360° of the periphery movement cycle provides a pulse to the chamber 34. Both the pulse passage 82 and the governor pressure passage 37 are restricted to damp the oscillatory regulating movement of the spool valve and to provide a sharply beginning and ending pulse pressure in the biasing chamber and similar oscillatory or dithering movement of the spool valve imposed on the oscillatory regulating movement of the control valve. The pulse oscillatory movement has a substantially higher cycle frequency than the oscillatory regulating movement, so the valve element 28 has continuous pulse oscillatory movement relative to sleeve 26 to reduce friction for free oscillatory regulating movement. The restriction of the pulse passage 82 is smaller than the restriction of the governor pressure passage 37, but due to the higher source pressure the pressure in the biasing pressure will have a sharply defined pulse which quickly increases and quickly returns to governor pressure. In the preferred embodiment particularly useful in automatic transmission governors which are driven at fairly slow speeds, we prefer to have two pulse ports 81 and passages 82 diametrically opposite each other, and thus equally circumferentially spaced, in the sleeve to provide two pulses during each revolution of the sleeve. It will be appreciated that in some governors operating at a higher speed that one pulse port 81 would be sufficient and that in very slow speed governors more pulse ports could be used to provide additional pulses during each revolution. However, the pulses should only occur during a small portion of the rotation cycle, e.g., 5° to 10° of a 360° cycle. This hydraulic pulsing arrangement provides a sharp pulse to impose on the regulatory oscillatory movement between the valve and the sleeve, a secondary oscillating or reciprocatory pulsing movement having a smaller amplitude and a higher frequency than the similar oscillating regulatory movement to maintain continuous movement between the spool valve and sleeve to provide the lower moving friction therebetween for free low friction movement for regulating the governor pressure.

It will be appreciated that various modifications of the above described preferred embodiment of the invention may be made.

It is claimed:

1. In a governor assembly; governor means having housing means having fluid pressure supply passage means and governor pressure passage means, drive means, weight means rotatably mounted on said housing means and rotatably driven by said drive means at governor speed for providing a speed bias force proportional to said governor speed, bias chamber means for providing a pressure bias force proportional to fluid pressure in said bias chamber means, branch passage means connecting said governor pressure passage means to said bias chamber means, governor valve means having relatively moving valve portions and being connected to said fluid pressure supply passage means, said governor pressure passage means, said weight means and said bias chamber means providing oscillatory regulating movement of said valve portions under the influence of said speed bias force and said pressure bias force acting in opposite directions for receiving fluid pressure supply from said fluid pressure supply means and supply regulated governor pressure proportional to governor speed to said governor pressure passage means and through said branch passage means to said biasing chamber means; and said governor means including a first member having a first circular surface and a second member having a second circular surface in sealing surface contact with said first circular surface at their interface operatively drive connected to said drive means for rotation relative to said first member and relative rotation of said first and second circular surfaces, pulse supply passage means connecting said fluid pressure supply passage to a circumferentially small portion of one circular surface and pulse delivery passage means connecting a small circumferential portion of the other circular surface to said biasing chamber means operative to supply a pulse pressure at least once during each relative revolution of said members to impose on said oscillating regulating movement of said valve portions a further oscillating pulsing movement to provide lower moving valve friction between said valve portions.

2. In a governor assembly; governor means having housing means having a high fluid pressure supply passage means and governor pressure passage means; drive means; weight means rotatably mounted on said housing means and rotatably driven by said drive means at governor speed for providing a speed bias force proportional to said governor speed; bias chamber means for providing a pressure bias force proportional to fluid pressure in said bias chamber means; restricted branch passage means connecting said governor pressure passage means to said bias chamber means for damping; governor valve means having relatively moving valve portions and connected to said fluid pressure supply passage means, said governor pressure passage means, said weight means and said bias chamber means providing oscillatory regulating movement of said valve portions under the influence of said speed bias force and said pressure bias force acting in opposite directions for receiving fluid pressure supply from said fluid pressure supply means and supplying regulated governor pressure proportional to governor speed, in a range of governor pressure below said high pressure fluid supply, to said governor pressure passage means and through said branch passage means to said biasing chamber means; and said governor means including a first member having a first circular surface and a second member having a second circular surface in sealing surface contact with said first circular surface at their interface operatively drive connected to said drive means for rotation relative to said first member and relative rotation of said first and second circular surfaces, pulse supply passage means connecting said fluid pressure supply passage to a circumferentially small portion of one circular surface and pulse delivery passage means connecting a small circumferential portion of the other circular surface to said biasing chamber means and one of said pulse supply and delivery passage means being more restricted than said restricted branch passage means operative to supply a pulse pressure higher than governor pressure at least once during each relative revolution of said members to impose on said oscillating regulating movement of said valve portions a further oscillating pulsing movement having a substantially higher frequency and a lower amplitude than said oscillating regulating movement to provide lower moving friction between said valve portions of said governor valve means.

3. In a governor; housing member means having fluid pressure passage means and governor pressure passage means; governor valve means having an internal valve member means, an external valve member means, drive means mounted on said housing member means operatively connected to one of said internal and external member means to rotate said one member means relative to said housing member means, means to axially position a first of said internal and external member means relative to said housing member means and to permit axial movement of the second member means, flyweight means mounted for rotation with said one member means driven by said drive means operatively connected to said first member means and said second member means for providing a speed bias force acting in one direction on said second member means proportional to the speed of rotation of said flyweight means, bias chamber means between said first and second member means connected to said governor pressure passage means for providing a governor pressure bias force acting in the opposite direction on said second member means relative to said first member means proportional to governor pressure and said first and second member means being continuously connected to said fluid pressure passage means, said governor pressure passage means, said speed bias force and said governor pressure bias force providing regulatory oscillating movement of said second member means relative to said first member means to regulate governor pressure proportional to speed; pulse means including a circular interface between a pair of said member means including said one rotating member means driven by said drive means and the other member means being stationary, a pulse supply passage in the stationary other member means connected to a small circumferential portion of said interface, a pulse delivery passage in the one rotating member means connected to a small circumferential portion of said interface and to said bias chamber means to supply a pressure pulse to said bias chamber means once during a small portion of each revolution of said one rotating member relative to said other stationary member to impose on said regulatory oscillating movement a pulsing oscillatory movement to reduce friction.

4. In a governor; housing member means having fluid high pressure passage means and governor pressure passage means; governor valve means having an internal valve member means, an external valve member means, drive means mounted on said housing member means operatively connected to one of said internal and external member means to rotate said one member means relative to said housing member means, means to axially position a first of said internal and external member means relative to said housing member means and to permit axial movement of the second member means, flyweight means mounted for rotation with said one member means driven by said drive means operatively connected to said first member means and said second member means for providing a speed bias force acting in one direction on said second member means proportional to the speed of rotation of said flyweight means, a first restriction, bias chamber means between said first and second member means connected through said first restriction to said governor pressure passage means for providing a damped governor pressure bias force acting in the opposite direction on said second member means relative to said first member means proportional to governor pressure and said first and second member means being continuously connected to said fluid pressure passage means, said governor pressure passage means, said speed bias force and said governor pressure bias force providing regulatory oscillating movement of said second member means relative to said first member means to regulate governor pressure proportional to speed in a range of governor pressure less than said high pressure; pulse means including a circular interface between a pair of said member means including said one rotating member means driven by said drive means and the other member means being stationary, a pulse supply passage in the stationary other member means connected to a small circumferential portion of said interface, a second restriction smaller than said first restriction, a pulse delivery passage in the one rotating member means including said second restriction connected to a small circumferential portion of said interface and to said bias chamber means to supply a pressure pulse to said bias chamber means at least once during a small portion of each revolution of said one rotating member relative to said other stationary member to impose on said regulatory oscillating movement a higher force pulsing oscillatory movement between said first and second members having a higher frequency and smaller amplitude than said regulatory oscillating movement to provide lower moving friction between said first and second members and prevent sticking for free regulatory oscillating movement.

5. In a governor; a housing having a bore; governor valve means including a valve sleeve having a bore and being rotatably mounted in said housing bore and a valve element mounted in said sleeve bore for oscillating regulatory movement; fluid supply means for supplying fluid under pressure; governor pressure passage means connected to said governor valve means; flyweight means; means to rotatably drive said valve sleeve and flyweight means at a speed proportional to the speed of a governed device, said flyweight means being operative in response to centrifugal force to bias said valve element to receive fluid under pressure from said supply means; biasing chamber means in said sleeve bore having an unbalanced area on said valve element for biasing pressure to act on said unbalanced area to bias said valve element against said bias by said flyweight means to exhaust fluid from said governor pressure passage means and providing said oscillatory regulatory movement of said valve element to regulate governor pressure proportional to the speed of rotation and deliver governor pressure to said governor pressure passage means and said biasing chamber means; pulsing means including a pulse passage in said body connecting said supply means to said housing bore and a pulse passage in said valve sleeve connected to said biasing chamber means and said pulse passages being interconnected once during a short portion of each revolution of said valve sleeve to deliver a fluid pressure pulse to said biasing chamber means to vibrate the valve element during oscillator regulatory movement.

6. In a governor; a housing having a bore; governor valve means including a valve sleeve having a bore and being rotatably mounted in said housing bore and a valve element mounted in said sleeve bore for regulatory oscillation; fluid supply means for supplying fluid under pressure; governor pressure passage means connected to said governor valve means; flyweight means; means to rotatably drive said valve sleeve and flyweight means at a speed proportional to the speed of a governed device, said flyweight means being operative in response to centrifugal force to bias said valve element to receive fluid under pressure from said supply means; a first restriction, biasing chamber means in said sleeve bore having an unbalanced area on said valve element for biasing pressure to act on said unbalanced area to bias said valve element against said bias by said flyweight means to exhaust fluid from said governor pressure passage means and providing said regulatory oscillation of said valve element to regulate governor pressure proportional to the speed of rotation and deliver governor pressure to said governor pressure passage means and through said first restriction to said biasing chamber means; pulsing means including a pulse passage in said body connecting said supply means to said housing bore, a second restriction smaller than said first restriction and a pulse passage including said second restriction in said valve sleeve connected at the interface between said valve sleeve and housing bore to said biasing chamber means and said pulse passages being interconnected once during a short portion of each revolution of said valve sleeve to deliver a fluid pressure pulse to said biasing chamber means to pulse oscillate the valve element with a high force during oscillator regulatory movement with a smaller amplitude and greater frequency of pulse oscillation than regulatory oscillation to reduce friction.

7. In a governor; a housing having a bore; a governor valve assembly including a valve sleeve having a bore and being rotatably mounted in said housing bore and a valve element mounted in said sleeve bore for reciprocation between feed and exhaust positions, means to rotatably drive said valve sleeve at a speed proportional to the speed of a governed device, flyweight means mounted on said valve sleeve for rotation with said valve sleeve and movement in response to centrifugal force to bias said valve element to the feed position, biasing chamber means in said sleeve bore having an unbalanced area on said valve element for biasing pressure to act on said unbalanced area to bias said valve element to exhaust position, fluid supply means including a supply port in said valve sleeve continuously connected through said body and valve sleeve supplying fluid under pressure to said supply port during rotation of said valve sleeve, governor pressure delivery means including a governor port in said valve sleeve continuously connected through said valve sleeve and body and continuously connected to said biasing chamber means during rotation of said valve sleeve, exhaust means including an exhaust port in said valve sleeve continuously connecting said exhaust port to exhaust, said valve element operably biased by said flyweight means and said biasing chamber pressure connecting said governor pressure delivery means selectively to said supply means and said exhaust means to continuously regulate governor pressure proportional to the speed of rotation of said valve sleeve and pulsing means including a pulse passage in said housing connecting said supply means to said housing bore and a pulse passage in said valve sleeve connected to said biasing chamber means and said pulse passages being interconnected once during each revolution of said valve sleeve when a pulse passage in the sleeve traverses a pulse passage in the housing to deliver a fluid pressure pulse to said biasing chamber means to vibrate the valve element during governor pressure regulation.

8. In a governor; a housing having a bore; a governor valve assembly including a valve sleeve having a bore and being rotatably mounted in said housing bore and a valve element mounted in said sleeve bore for reciprocation between feed and exhaust positions, means to rotatably drive said valve sleeve at a speed proportional to the speed of a governed device, flyweight means mounted on said valve sleeve for rotation with said valve sleeve and movement in response to centrifugal force to bias said valve element to the feed position, biasing chamber means in said sleeve bore and having an unbalanced area on said valve element for biasing pressure to act on said unbalanced area to bias said valve element to exhaust position, fluid supply means including a supply port in said valve sleeve continuously connected through said body and valve sleeve supplying fluid under pressure to said supply port during rotation of said valve sleeve, governor pressure delivery means including a governor port in said valve sleeve continuously connected through said valve sleeve and body and continuously connected to said biasing chamber means during rotation of said valve sleeve, exhaust means including an exhaust port in said valve sleeve continuously connecting said exhaust port to exhaust, said valve element operably biased by said flyweight means and said biasing chamber pressure connecting said governor pressure delivery means selectively to said supply means and said exhaust means to continuously regulate governor pressure proportional to the speed of rotation of said valve sleeve and pulsing means including a pulse passage in said housing connecting said supply means to a short circumferential portion of said housing bore and a pulse passage in said valve sleeve connected to said biasing chamber means and a short circumferential portion of the outer surface of said valve sleeve and said pulse passages being interconnected once during a small portion of each revolution of said valve sleeve when a pulse passage in the sleeve traverses a pulse passage in the housing to deliver a fluid pressure pulse to said biasing chamber means to pulse oscillate the valve element during regulatory oscillation for governor pressure regulation with a pulse oscillation with a smaller amplitude and larger frequency than the regulatory oscillation.

* * * * *